United States Patent
Choi

(10) Patent No.: US 7,248,679 B2
(45) Date of Patent: Jul. 24, 2007

(54) APPARATUS AND METHOD FOR TRANSMITTING-RECEIVING CID IN A PBX

(75) Inventor: Pil Heon Choi, Suwon-si (KR)

(73) Assignee: LG-Nortel Co., Ltd., Seoul (KR)

(*) Notice: Subject to any disclaimer, the term of this patent is extended or adjusted under 35 U.S.C. 154(b) by 371 days.

(21) Appl. No.: 10/622,467

(22) Filed: Jul. 21, 2003

(65) Prior Publication Data

US 2004/0208300 A1    Oct. 21, 2004

(30) Foreign Application Priority Data

Jul. 22, 2002   (KR) .................... 10-2002-0042963

(51) Int. Cl.
*H04M 1/00* (2006.01)
*H04M 1/56* (2006.01)
*H04M 15/06* (2006.01)
*H04M 3/00* (2006.01)

(52) U.S. Cl. ................ 379/157; 379/165; 379/142.01; 379/142.07; 379/198

(58) Field of Classification Search ............. 379/156, 379/157, 164, 165, 142.01, 142.04, 142.07, 379/142.12, 142.14, 142.15, 142.17, 88.19, 379/88.2, 88.21, 93.17, 93.23, 198, 201.01, 379/207.15
See application file for complete search history.

(56) References Cited

U.S. PATENT DOCUMENTS

| | | | | |
|---|---|---|---|---|
| 5,875,234 A * | 2/1999 | Clayton et al. | ......... | 379/93.05 |
| 6,134,308 A * | 10/2000 | Fallon et al. | ......... | 379/142.06 |
| 6,324,263 B1 * | 11/2001 | Sherwood et al. | ....... | 379/88.19 |
| 6,493,439 B2 * | 12/2002 | Lung et al. | ............ | 379/142.01 |
| 6,952,468 B2 * | 10/2005 | Lee | ........................ | 379/142.12 |
| 7,130,598 B2 * | 10/2006 | Lee et al. | .............. | 379/142.07 |
| 2001/0012349 A1 * | 8/2001 | Karnowski | ................... | 379/156 |
| 2003/0059007 A1 * | 3/2003 | Beyda | ...................... | 379/88.19 |
| 2003/0228001 A1 * | 12/2003 | Nakatsu | ..................... | 379/67.1 |

* cited by examiner

Primary Examiner—Quoc Tran
(74) Attorney, Agent, or Firm—KED & Associates, LLP

(57) ABSTRACT

A PBX connected to a public exchange includes a separate caller ID service unit for providing a caller ID and/or a system tone by performing a digital signal process. To display the caller ID on a receiver terminal, or caller ID phone, a line is established with the PBX through general switched telephone network, and a CID received through the line is converted and stored in the caller ID service block mounted with at least one memory through a switching block, under control by a control block. Then, the control block transmits all or part of the stored CIDs to the caller ID phone through the switching block and/or a subscriber line convergency unit.

24 Claims, 10 Drawing Sheets

APPARATUS AND METHOD FOR TRANSMITTING-RECEIVING CID IN A PBX

BACKGROUND OF THE INVENTION

1. Field of the Invention

The present invention relates to an apparatus and a method for transmitting and receiving Caller ID (CID) in a network exchange.

2. Background of the Related Art

A network exchange (e.g., a Private Branch Exchange (PBX) for transmitting/receiving CID of the related art is explained with reference to drawings. Before getting into further description, it will be helpful to explain about CID service. As the name implies, CID service provides a caller's phone number on a receiver's phone or display terminal before the receiver answers the call.

FIG. 1 is a schematic block diagram of a configuration of an apparatus for transmitting and receiving CID in PBX of the related art. FIG. 2 is a schematic block diagram of a configuration of an analog trunk convergency illustrated in FIG. 1. FIG. 3 is a schematic block diagram of a configuration of a subscriber line convergency illustrated in FIG. 1.

Referring to FIG. 1, the PBX 110 receives a CID provided through an office line from a public exchange (PX) 100 and transmits the CID to an affected terminal. The PBX 110 for CID service includes an Analog Trunk Convergency or interface (ATC) block 120, a system control block 125, a system bus control block 130, a switching block 135, a DTMF transmitting/detecting block 140, and a Subscriber Line Convergency or interface (SLC) block 150.

The ATC block 120 is used for converging with lines connected to an external exchange (for example, a payphone). Thus, when a ring signal is received from the public exchange 100, the ATC block 120 detects the ring signal and obtains a CID provided between the first ring signal and the second ring signal and stores the CID in a predetermined area of each port.

Additional details on the ATC block 120 follow with reference to FIG. 2. As shown in the drawing, the ATC block 120 includes a plurality of ports (e.g., 32 ports) 111, a local control block 117, a memory interface block 118, and memory blocks 119 for respective ports. Each of the plurality of ports 111 detects a ring signal that is transmitted through an office line, transmits the ring signal detection data to the local control block 117, and detects the CID utilizing the ring signal.

Each of the plurality of ports 111 includes an A/D and D/A converting block 112 for converting the CID received from the public exchange 100 through a subscriber line into analog data and transmitting the data to the switching block 135 through a highway, one of data paths, a ring detecting block 113 for detecting a ring signal received from the public exchange through the subscriber line, a holding line 114 for establishing and holding a line, and a CID detecting block 115 for detecting the CID received between the first ring and the second ring.

The CID, being detected by the CID detecting block 115, is then transmitted to the port memory blocks 119 through the memory interface block 118. The memory blocks 119 store the CID in the predetermined areas of respective ports. The local control block 117 reads the ring signal detection data provided by the ring detecting block 113 and the CID stored in the memory blocks 119, and transmits them to the system control block 125 through the system bus.

As shown in FIG. 3, the SLC block 150 includes a local control block 157, a memory block 159, a memory interface block 158, and a plurality of ports 151. The local control block 157 transmits a ring transmission message to each of the ports 151, receives the CID from the system control block 125, and transmits the CID to the memory 159. The memory block 159 stores the CID provided by the local control block 157 in a corresponding area of each port.

Each of the ports 151 includes an A/D and D/A converting block 152 for converting digital data transmitted through the system bus into analog data and transmitting the converted data to an affected receiver terminal, a ring transmitting block 153 for transmitting a ring, corresponding to the ring transmission message that is transmitted to the local control block 157 through the system bus, a CID transmitting block 155 for extracting the CID between the first ring and the second ring from the port memory blocks 159 when the ring is transmitted, and transmitting the CID to an affected terminal, and a system tone transmitting block 156 for extracting and transmitting a system tone, and an off-hook detecting block 154 for detecting off-hook status of the affected terminal of a receiver.

Referring back to FIG. 1, operation principles of receiving the CID in the PBX of the related art are now explained. The system control block 125 transmits the ring transmission message to the SLC block 150, in response to the ring signal detection data transmitted from the ATC block 120. Also, the system control block 125 transmits the CID transmitted from the ATC block 120 to the affected SLC block 150 through the system bus. Then the SLC block 150 transmits the CID, which has been transmitted through the system bus, to a CID phone 160 of a corresponding port.

Following is a description of a method for receiving the CID in the PBX of the above construction. When a ring tone is received to the ATC block 120 in the PBX 110 from the SLC block 150 in the PX 100, the ring detecting block 113 in the ATC block of FIG. 2 detects whether the ring tone has actually been received, and if so, the local control block 117 reports it to the system control block 125 through the system bus. In general, the CID is received between the first predetermined ring and the second predetermined ring. Here, the CID detecting block 115 stores, through the memory interface block 118, the CID in the predetermined areas of the port memory blocks 119. The local control block 117 reads the CID being stored in each of the port memory blocks, and reports it to the system control block 125 through the system bus. The system control block 125 transmits the CID to the corresponding SLC block 150 in the PBX 110 through the system bus.

Later, the local control block 157 in the SLC block 150 provides the CID service to each of the affected ports 151. Then the CID is transferred through the subscriber line and displayed on the caller ID phone 160 at the subscriber side. To transmit and receive the CID, a commercialized IC has been traditionally used as a line base as illustrated in FIGS. 2 and 3. As a result, the CID display in the PBX of the related art has been ineffective and uneconomical.

SUMMARY OF THE INVENTION

An object of the invention is to solve at least the above problems and/or disadvantages and to provide at least the advantages described hereinafter. Accordingly, one object of an embodiment of the present invention is to solve the foregoing problems by providing an apparatus and method for transmitting and receiving a CID in a PBX, capable of transmitting the CID provided by an official line to an affected subscriber by mounting a CID service block including a DSP filter inside the PBX. To illustrate embodiments of the present invention the term "Convergency" will be used as meaning the same as "interface". For example, an ATC is used to denote and analog trunk convergency or interface.

The foregoing and other objects and advantages are realized by providing an apparatus for transmitting and receiving CID (Caller ID) in a PBX, the apparatus including: an ATC (Analog Trunk Convergency) unit for converging with an exchange in the PBX connected to the exchange; a SLC (Subscriber Line Convergency) unit for transmitting CID and/or data by converging with a subscriber line connected to each port; a control block for controlling a CID service for the analog trunk and the subscriber line units; a data path control block for controlling data transmission through a data path between the ATC unit and the SLC unit; a signal transmitting/detecting block for performing signal transmitting and/or detecting through the data path; and a switching block for connecting the data path between a CID service unit, the CID service block providing CIDs and/or system tones through a digital signal process, and the ATC and SLC units, and for selectively switching the data path between the signal transmitting/detecting block and the CID service unit.

Another embodiment of the invention provides a method for transmitting and receiving a CID (Caller ID) in a PBX, the method including the steps of: establishing a line with the PBX through a general switched telephone network; converting a received data through the line, and under control of a control block, storing the data through a switching block in a CID service unit comprised of at least one memory; and transmitting, at the control block, all or part of the stored CID to a caller ID phone, as a receiver terminal, through the switching block and/or a SLC (Subscriber Line Convergency) block and display the CID on the phone.

Another aspect of an embodiment of the invention provides a method for transmitting and receiving a CID (Caller ID) in a PBX, the method including the steps of: storing CIDs in a first memory; storing preassigned CIDs out of the stored CIDs for transmission in a second memory; transmitting the CIDs stored in the second memory to a caller ID terminal through a switching block and/or a SLC (Subscriber Line Convergency) unit; and displaying the transmitted CIDs on the caller ID terminal.

Embodiments of the present invention can be advantageously used for reducing size and cost, and more convenient maintenance, by transmitting and receiving CID regarding calling and receiving signals (or calls) at the ATC and SLC units through a CID service block including a DSP filter, and using each of the transmitting/detecting blocks of ports as a resource block without converging the transmitting/receiving block by ports.

Additional advantages, objects, and features of embodiments of the invention will be set forth in part in the description which follows and in part will become apparent to those having ordinary skill in the art upon examination of the following or may be learned from practice of the invention. The objects and advantages of embodiments of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 1:
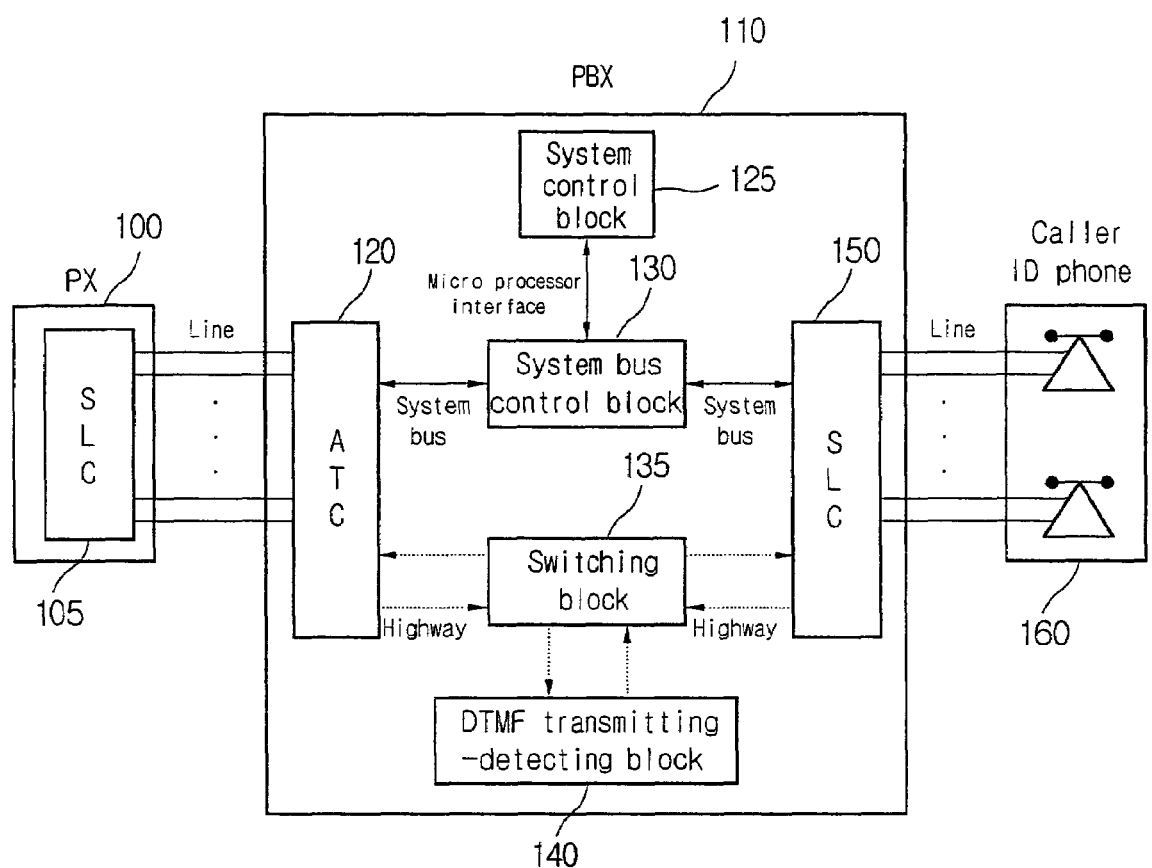
FIG. 1 is a schematic block diagram of a configuration of an apparatus for transmitting and receiving CID (Caller ID) in PBX of the related art.
Figure 2:
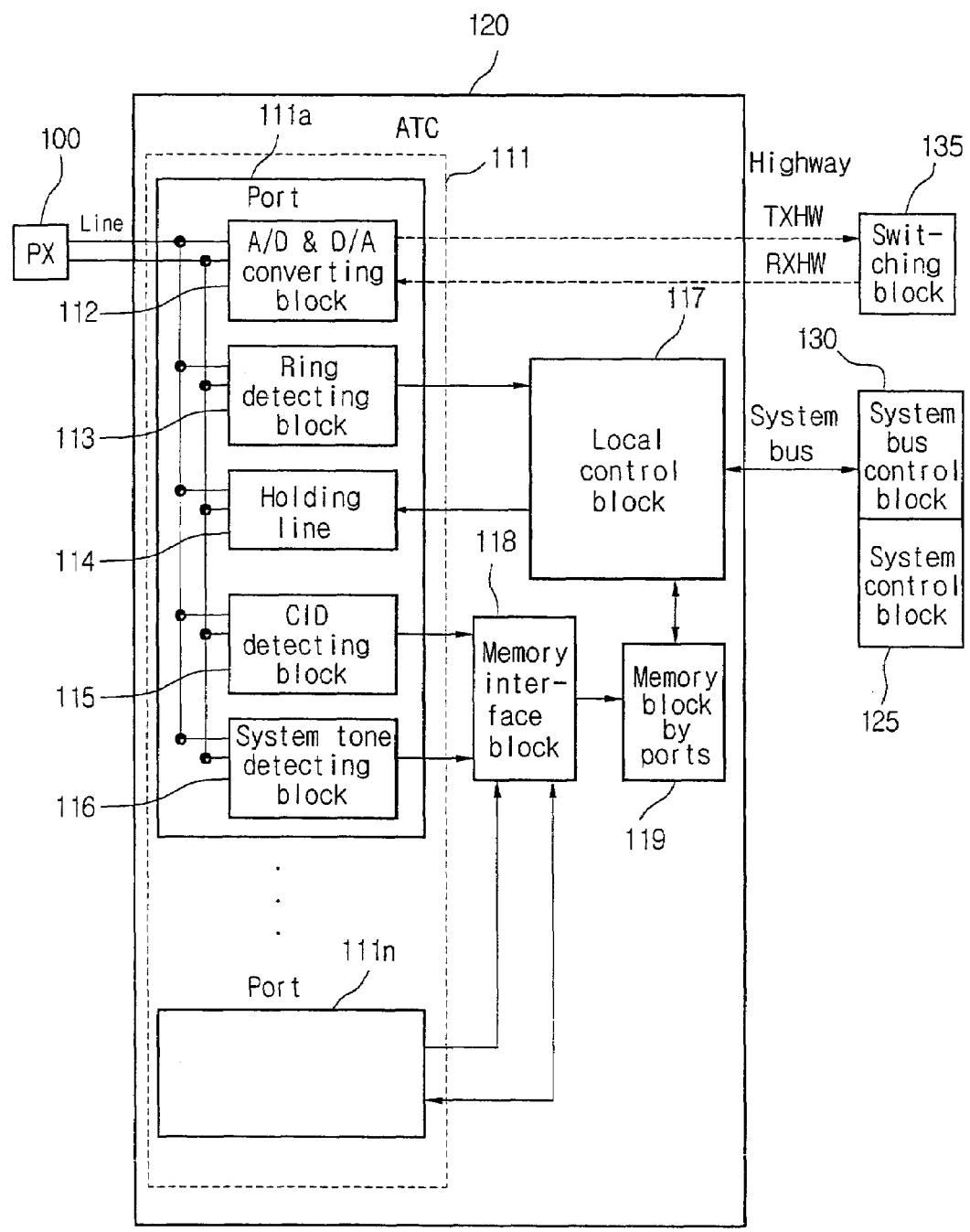
FIG. 2 is a schematic block diagram of a configuration of an ATC (Analog Trunk Convergency) block illustrated in FIG. 1.
Figure 3:
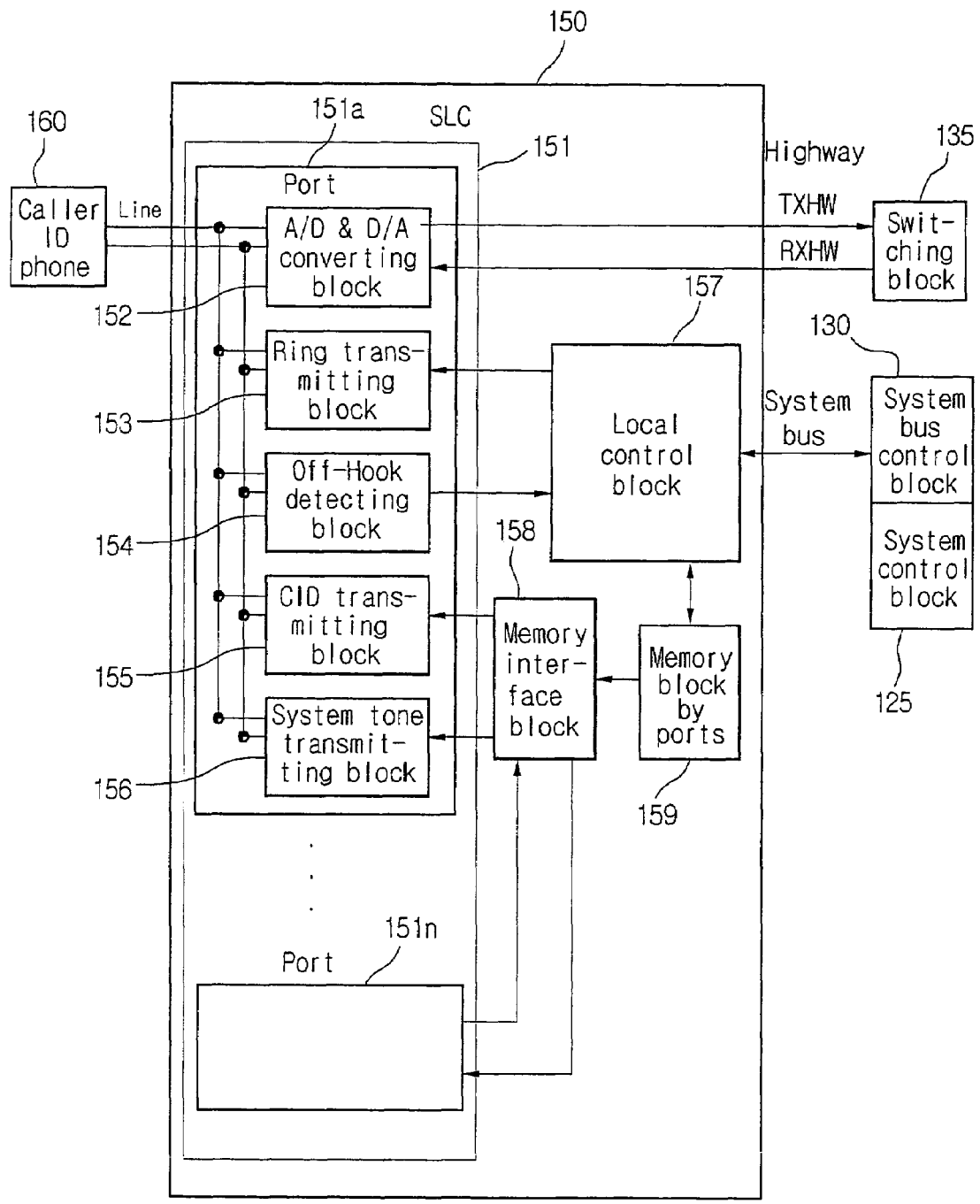
FIG. 3 is a schematic block diagram of a configuration of a SLC (Subscriber Line Convergency) block illustrated in FIG. 1.
Figure 4:
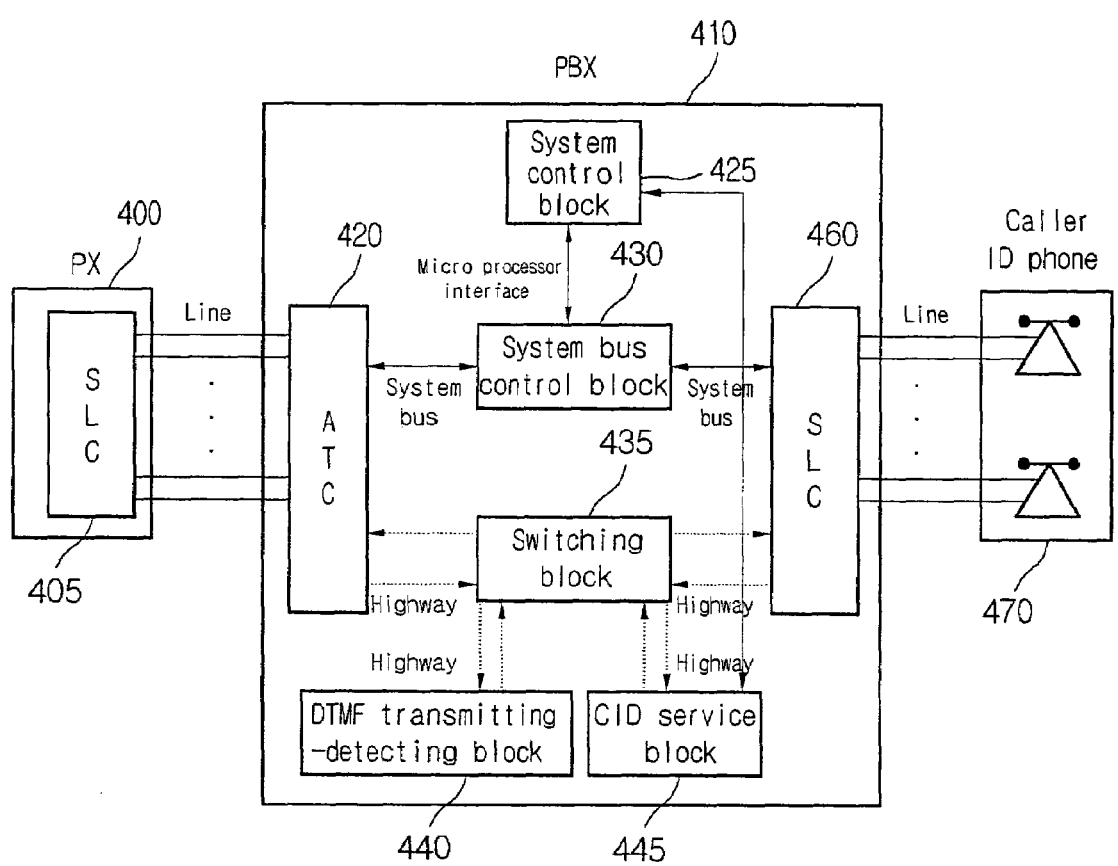
FIG. 4 is a schematic block diagram of an apparatus for transmitting and receiving CID in a PBX according to an embodiment of the present invention.
Figure 5:
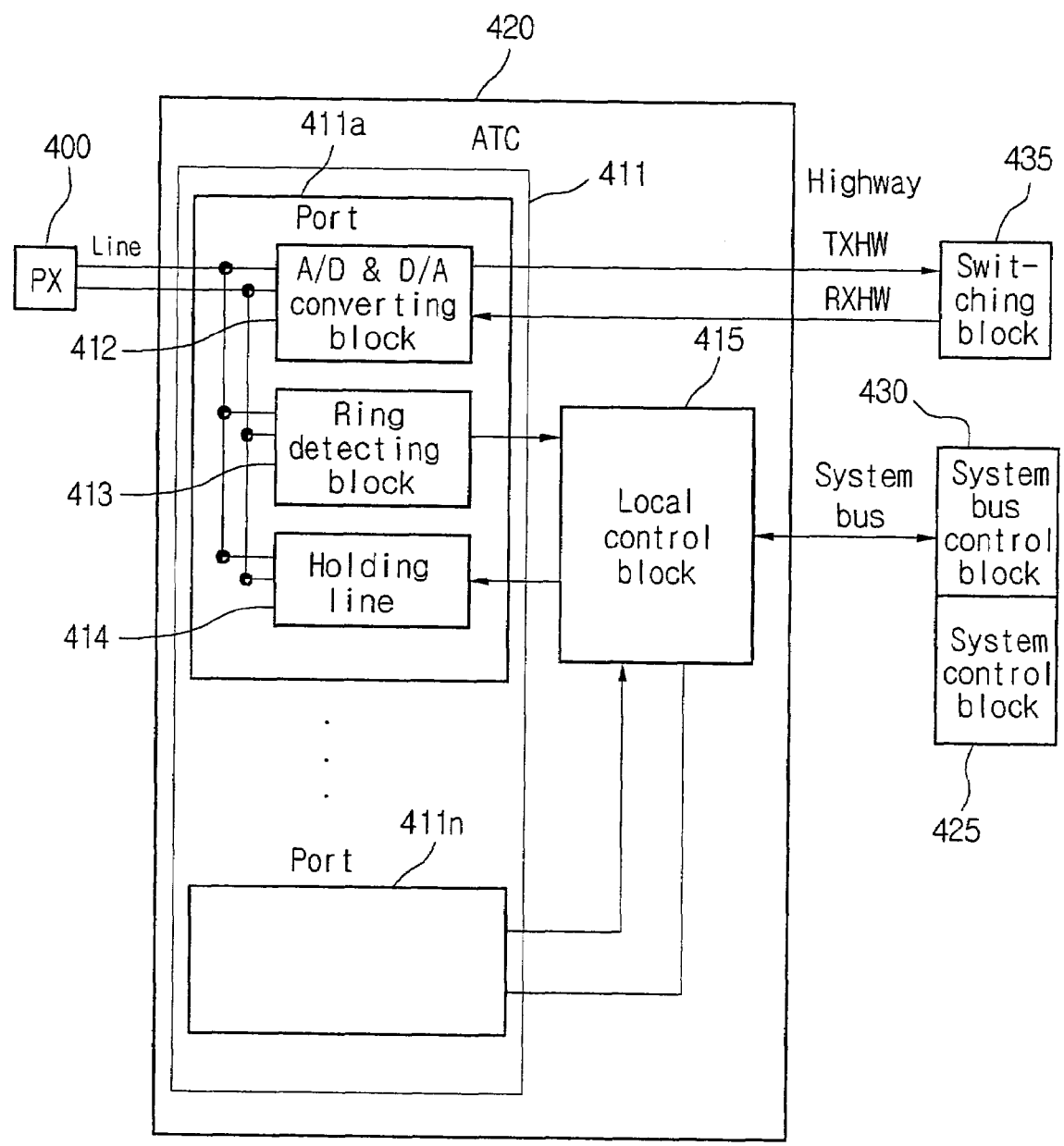
FIG. 5 is a schematic block diagram of an ATC block illustrated in FIG. 4.
Figure 6:
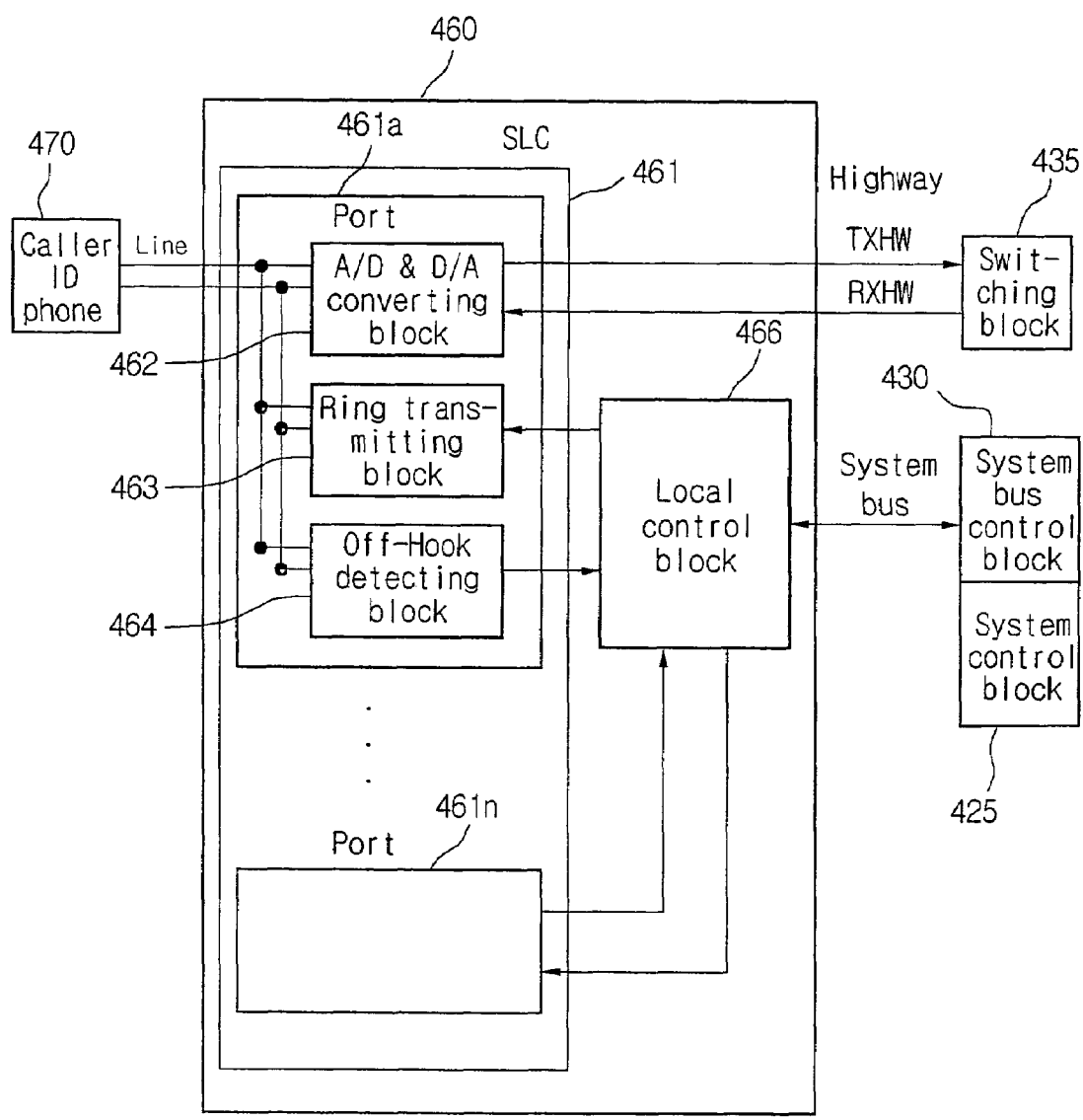
FIG. 6 is a schematic block diagram of a SLC block illustrated in FIG. 4.
Figure 7:
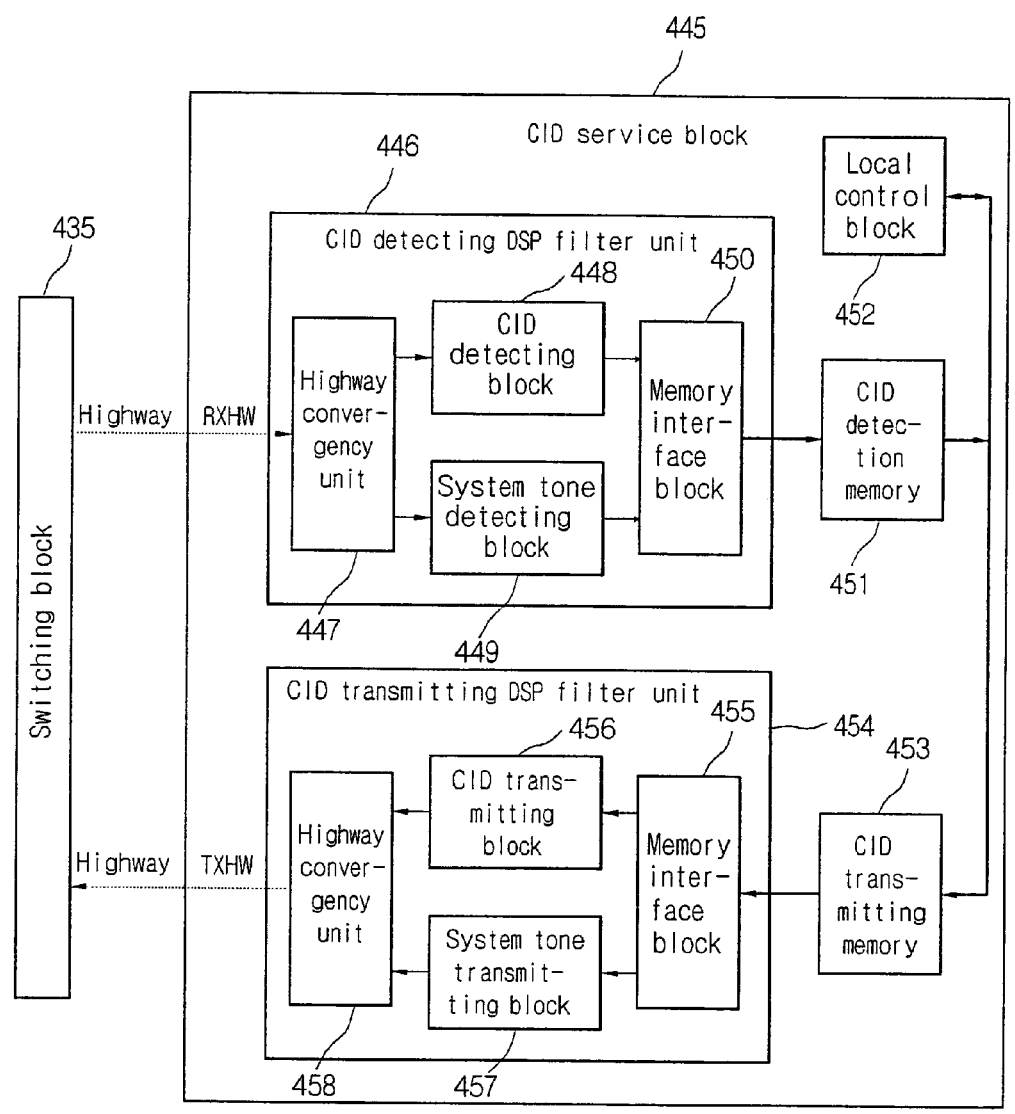
FIG. 7 is a schematic block diagram of a CID service block illustrated in FIG. 4.
Figure 8:
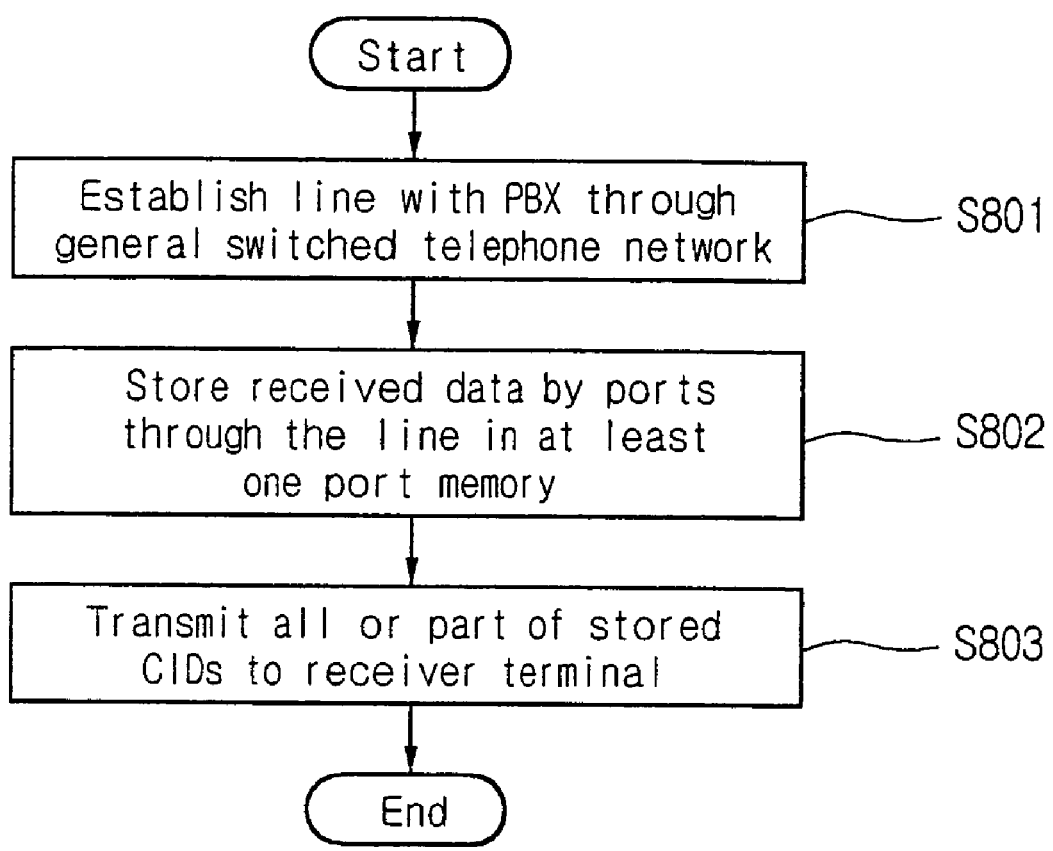
FIG. 8 is a flow chart describing a method for transmitting and receiving CID in a PBX according to an embodiment of the present invention.
Figure 9:
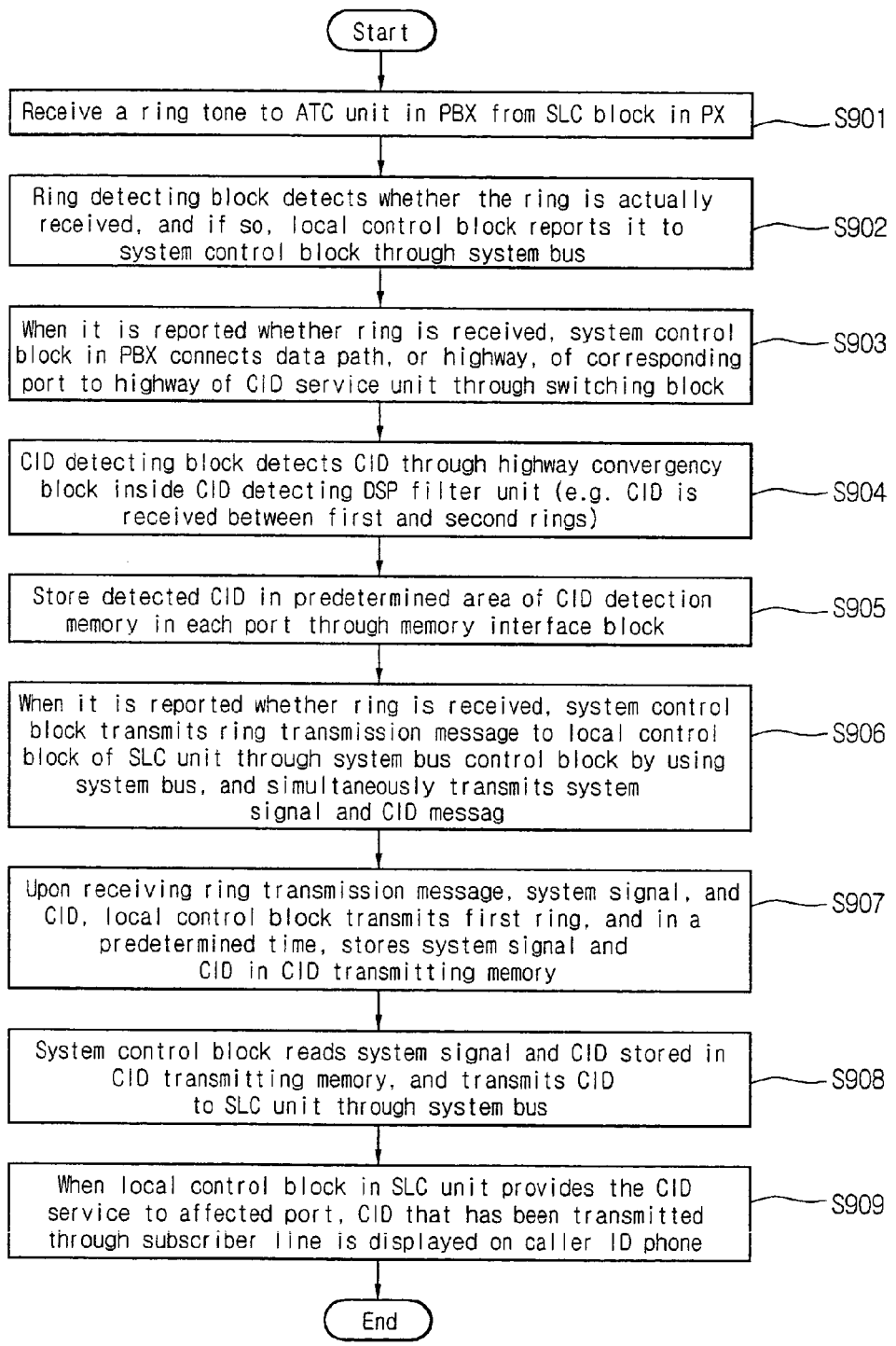
FIG. 9 is a detailed flow chart describing the method for transmitting and receiving CID in the PBX according to an embodiment of the present invention.
Figure 10:
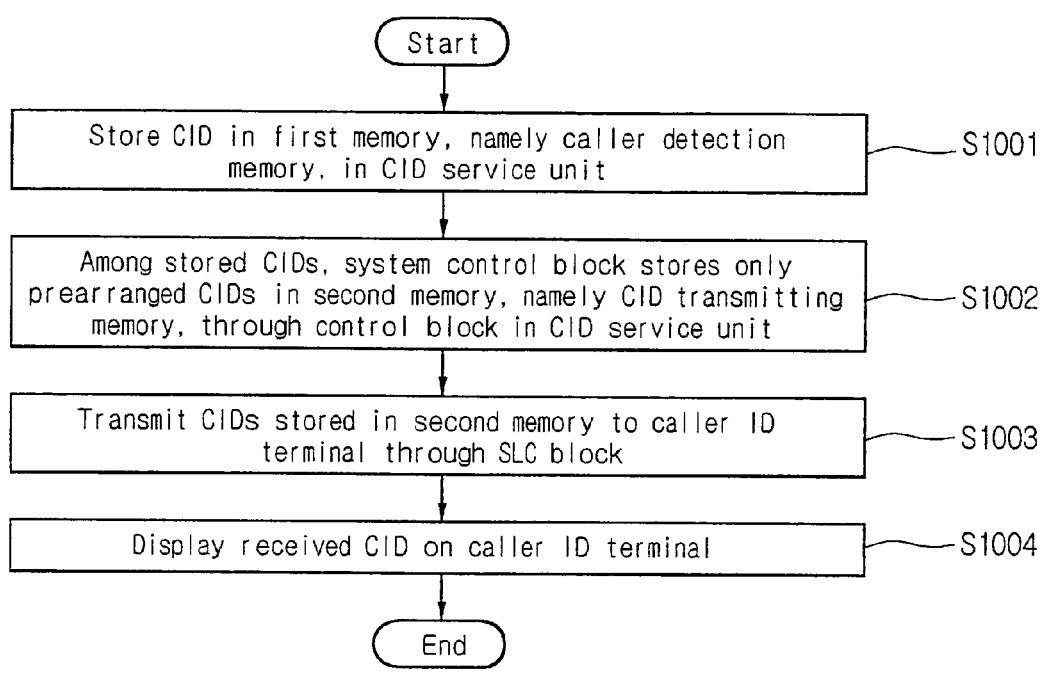
FIG. 10 is a flow chart describing a procedure of storing, outputting and displaying the CID.

FIG. 4 is a schematic block diagram of an apparatus for transmitting and receiving CID in a PBX according to an embodiment of the present invention. FIG. 5 is a schematic block diagram of an ATC block illustrated in FIG. 4. FIG. 6 is a schematic block diagram of a SLC block illustrated in FIG. 4. FIG. 7 is a schematic block diagram of a CID service unit illustrated in FIG. 4. FIG. 8 is a flow chart describing a method for transmitting and receiving CID in a PBX according to the present invention. FIG. 9 is a detailed flow chart describing the method for transmitting and receiving CID in the PBX according to the present invention. FIG. 10 is a flow chart describing a procedure of storing, outputting and displaying the CID.

Referring first to FIG. 4, a private branch exchange (PBX) 410 is connected to a Subscriber Line Convergency (SLC) unit 405 in a public exchange (PX) 400. The PBX includes an Analog Trunk Convergency (ATC) unit 420 for converging with trunks (or lines) connected to an external exchange. A system control block 425 controls a Caller ID (CID) service for analog trunk and subscriber line. An SLC unit 460 is provided for converging with the subscriber line connected to each port and transmitting CID and data. A system bus control block 430 controls data transmission between the ATC unit 420 and the SLC unit 460 through a system bus. A DTMF transmitting/detecting block 440 transmits/detects DTMF through a highway connection with a switching block 435. A CID service unit 445, being one independent unit using a DSP filter, provides the CID service, namely providing a CID and a system tone. Switching block 435 provides for selectively switching a highway connection which is a data path between the ATC unit 420 and the SLC unit 460, and selectively switching a highway connection between the DTMF transmitting/detecting block 440 and the CID service unit 445.

As shown in FIG. 5, the ATC unit 420 includes a plurality of ports 411, and a local control block 417 for controlling CID transmission through the system bus. Each of the plurality of ports 411 detects a ring signal that is transmitted through an office line, and transmits ring signal detection data to the local control block 415. Each of the plurality of ports 411 includes an A/D and D/A converting block 412 for converting the CID received from the public exchange 400 through a subscriber line, or office line, into analog data and transmitting the data to the switching block 435 through a highway which is a data path. A ring detecting block 413 detects a ring signal received from the public exchange 400 through the subscriber line. A holding line 414 provides for establishing and holding a line.

The local control block 415 controls CID transmission through the system bus. More specifically, it transmits the ring signal detection data provided by the ring detecting block 413 to a system control block 425 through the system bus. The system control block 425 transmits a ring transmission message to the SLC unit 460, in response to the ring signal detection data transmitted from the local control block 415, extracts CID out of the CID service block 445, and transmits the CID to the SLC unit 460. The system control block 425 extracts only prearranged CIDs of a corresponding port to be displayed on a caller ID terminal 470.

As shown in FIG. 6, the SLC unit 460 includes a plurality of ports 461, and a local control block 466 for controlling CID transmission, the CID being transmitted through the system bus. Each of the ports 461 includes an A/D and D/A converting block 462 for converting the CID transmitted through the switching block 435 of FIG. 4 into digital data. A ring transmitting block 463 transmits a ring to an affected receiver terminal when a ring transmission message is received from the local control block 466. An off-hook detecting block 464 detects an off-hook status of the affected receiver terminal.

As depicted in FIG. 7, the CID service unit 445 includes a CID detecting DSP filter unit 446 for detecting a signal and a CID received through the data path, or highway, connected by the switching block 435, and storing them in a corresponding port area inside a CID detection memory block. A CID transmitting DSP filter unit 454 transmits the CID to an affected receiver terminal through the data path, or highway. A CID detection memory 451 assigns a memory area for each of the subscriber ports of the SLC unit 460 and storing the signal and the CID in a corresponding port. A CID transmitting memory 453 stores system signals and CIDs in ports, in order to transmit the CID between the predetermined first ring and second ring to the affected receiver terminal when a ring is transmitted to the affected receiver terminal. A local control block 452 controls CID transmission to a corresponding port in the SLC unit 460 through the system bus by reading the signal and the CID in each port.

The CID detecting DSP filter unit 446 includes a highway convergency block 447 for receiving the signal and the CID by converging with the highway as the data path connected by the switching block 435. A CID detecting block 448 detects the CID provided by the highway convergency block 447. A system signal detecting block 449 detects a system signal transmitted to the highway convergency block 447. A memory interface block 450 interfaces with the CID detection memory 451, to store the CID detected by the CID detecting block 448 and the signal detected by the system signal detecting block 449 in a predetermined memory area of a corresponding port.

The CID transmitting DSP filter unit 454 includes a memory interface block 455 for interfacing CID that is transmitted from the CID transmitting memory 453. A CID transmitting block 456 transmits the CID from the CID transmitting memory 453 to a highway convergency block 458, in order to transmit the CID to the switching block 435 later. A system signal transmitting block 457 transmits the system signal provided by the CID transmitting memory 453 to the highway convergency block 458. The highway convergency block 458 transmits the signal and the CID by converging with the data path, or highway, connected to the switching block 435.

A method for transmitting and receiving CID in a PBX of embodiments of the present invention is now explained with reference to FIGS. 8, 9 and 10. FIG. 8 is a flow chart briefly describing the method for transmitting and receiving CID in the PBX according to an embodiment of the present invention. As illustrated in FIG. 8, a line is established with the PBX through a general switched telephone network (S801). The data received through the line is converted and controlled by the control block, and stored in the CID service block including at least one memory block through the switching block (S802). Under control of the control block, all or part of the stored CID is transmitted to the caller ID phone, that is, the receiver terminal, through the switching block and the SLC block, and displayed (S803).

FIG. 9 is a detailed flow chart describing the method for transmitting and receiving CID in the PBX according to an embodiment of the present invention. A ring (tone) is received to the ATC unit 420 in the PBX 400 from the SLC block 405 in the PX 400 (S901). The ring detecting block 413 detects whether the ring is actually received, and if so, the local control block 415 reports it to the system control block 425 through the system bus (S902).

Upon receiving the ring is reported, the system control block 425 in the PBX 410 connects the highway as the data path of the corresponding port to the highway of the CID service block 445 through the switching block 435 (S903). The CID is usually received between the predetermined first ring and second ring, and the CID detecting block 448 detects this CID through the highway convergency block 447 inside the CID detecting DSP filter unit 446 (S904). The detected CID is stored in the predetermined area of the CID detection memory 451 per port through the memory interface block 450 (S905).

In the meantime, when it is reported that the ATC unit 420 received the ring, the system control block 425 transmits a ring transmission message via the system bus, so that the message is transmitted to the local control block 466 of the SLC unit 460 through the system bus control block 430, and simultaneously transmits the system signal and CID messages (S906). Upon receiving the ring transmission message, the system signal, and the CID, the local control block 466 transmits the first ring (tone), and in a predetermined time, say, in 200–300 ms, stores the system signal and the CID in the CID transmitting memory 453 (S907).

The system control block 425 reads the system signal and the CID being stored in the CID transmitting memory 453, and transmits the CID to the SLC unit 460 through the switching block 435 and the system bus (S908). Afterwards, as the local control block 466 in the SLC unit 460 provides the CID service to the affected port, the CID is transferred through the subscriber line and displayed on the caller ID phone 470 at the subscriber side (S909).

FIG. 10 is a flow chart describing a procedure of storing, outputting and displaying the CID. The CID is stored in a first memory, namely a caller detection memory, in the CID service unit 445 (S1001). Out of the stored CIDs, the system control block stores only the prearranged CIDs in a second memory, namely a CID transmitting memory, through the control block in the CID service unit (S1002). The CIDs stored in the second memory is then transmitted to the caller ID terminal through the switching block and the SLC unit (S1003). Lastly, the received CID is displayed on the caller ID terminal (S1004).

As discussed before, embodiments of the present invention provide an apparatus and method for displaying CID through a separate CID service block, without requiring many components for respective ports. Embodiments of the present invention can be advantageously used for reducing size and cost, and more convenient maintenance, by transmitting and receiving CID regarding calling and receiving signals at the ATC and SLC units through a CID service block including a DSP filter, and using each of the transmitting/detecting blocks of ports as a resource block without converging the transmitting/receiving block by ports.

While the invention has been shown and described with reference to certain preferred embodiments thereof, it will be understood by those skilled in the art that various changes in form and details may be made therein without departing from the spirit and scope of the invention as defined by the appended claims. Accordingly, the foregoing embodiments and advantages are merely exemplary and are not to be construed as limting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A Private Branch Exchange (PBX) apparatus for transmitting and receiving CID (Caller ID) comprising:
    an Analog Trunk Convergency (ATC) circuit for converging with an exchange in the PBX connected to the exchange;
    a Subscriber Line Convergency (SLC) circuit for transmitting CID and/or data by converging with a subscriber line connected to each port;
    a control circuit for controlling a CID service for the analog trunk and the subscriber line circuits;
    a data path control circuit for controlling data transmission through a data path between the ATC circuit and the SLC circuit;
    a CID service circuit, the CID service circuit including a CID and signal detecting circuit and a CID and signal transmitting circuit that each perform digital signal processing on the CIDs and signals;
    a signal transmitting/detecting circuit for performing signal transmitting and/or detecting through the data path; and
    a switching circuit for connecting the data path between the CID service circuit, and the ATC circuit and the SLC circuit, and for selectively switching the data path between the signal transmitting/detecting circuit and the CID service circuit.

2. The apparatus according to claim 1, wherein the ATC circuit comprises:
    a plurality of ports, each port comprising a converting circuit for converting the CID received from a public exchange through a subscriber line or office line into analog data and transmitting the data to the switching circuit through a highway as a data path, a ring detecting circuit for detecting a ring signal received from the public exchange through the subscriber line, and a holding line for establishing and holding the subscriber line; and
    a local detecting circuit connected to the ports, for controlling CID transmission through a system path.

3. The apparatus according to claim 1, wherein the SLC circuit comprises:
    a plurality of ports, each of the ports comprising: a converting circuit for converting the CID transmitted through the switching circuit into a digital signal, a ring transmitting circuit for transmitting a ring to an affected receiver terminal in response to a ring transmission message from the local control block, and an off-hook detecting circuit for detecting off-hook status of the affected terminal of a receiver; and
    a local control circuit for controlling the transmission of the CID transmitted through a system bus.

4. An apparatus in a Private Branch Exchange (PBX) for transmitting and receiving a Caller ID (CID) comprising:
    a CID detecting circuit for detecting a system signal and/or a CID received through a highway as a data path connected by a switching block, and storing the signal and/or the CID in a corresponding area per port inside a CID detection memory block;
    a CID transmitting circuit for transmitting the CID to an affected receiver terminal through the highway as the data path;
    a CID detection memory for assigning a memory area to each of subscriber ports of the SLC circuit and storing the signal and/or the CID for a corresponding port;
    a CID transmitting memory for storing a system signal and/or a CID in each port, in order to transmit a predetermined CID to an affected receiver terminal when a ring signal is transmitted to the affected receiver terminal; and
    a local control circuit for controlling CID transmission to a corresponding port in a Subscriber Line Convergency (SLC) circuit through a system bus by reading the signal and/or the CID of each port from the CID detection memory,
    wherein the apparatus detects the CID or the system signal for a transmitted or received call at an Analog Trunk Convergency (ATC) circuit and the SLC circuit in the PBX and transmits the detected CID or signal to a receiver terminal.

5. The apparatus according to claim 4, wherein the CID detecting circuit comprises:
    a highway convergency circuit for receiving the signal and/or the CID by converging with the data path connected by the switching block;
    a CID detecting circuit for detecting the CID received from the highway convergency block;
    a system signal detecting circuit for detecting a system signal transmitted to the highway convergency block; and
    a memory interface circuit for interfacing with the CID detection memory, to store the CID detected by the CID detecting circuit and the signal detected by the system signal detecting circuit in a predetermined memory area of a corresponding port.

6. The apparatus according to claim 4, wherein the CID transmitting circuit comprises:
    a memory interface circuit for interfacing CID that is transmitted from the CID transmitting memory;
    a CID transmitting circuit for transmitting the CID from the CID transmitting memory to a highway convergency block, in order to transmit the CID to the switching block;

a system signal transmitting circuit for transmitting the system signal received from the CID transmitting memory; and
a highway convergency circuit for transmitting the signal and/or the CID by converging with the highway as the data path connected to the switching block.

7. A method for transmitting and receiving a Caller ID (CID) in a Private Branch Exchange (PBX), the method comprising:
   establishing a line with the PBX through a general switched telephone network;
   converting a CID received through the line, and storing the CID through a switching circuit in a CID service circuit at the PBX that includes at least one memory; and
   transmitting all or part of the stored CID to a terminal, through the switching circuit and/or a Subscriber Line Convergency (SLC) circuit and display the CID on the terminal.

8. A method for transmitting and receiving a Caller ID (CID) in a Private Branch Exchange (PBXD, the method comprising: storing CIDs in a first memory in a CID service circuit at the PBX;
   storing preassigned CIDs for transmission out of the stored CIDs in a second memory in the CID service circuit; and
   transmitting the preassigned CIDs stored in the second memory to a caller ID terminal through a switching circuit and/or a Subscriber Line Convergency (SLC) circuit.

9. The method according to claim 8, wherein the first memory comprises a caller detection memory of the CID service circuit.

10. The method according to claim 8, wherein a system control circuit stores the preassigned CIDs out of the stored CIDs in the second memory through a control circuit of the CID service circuit, the second memory comprising a CID transmitting memory.

11. The method according to claim 8, wherein the storing CIDs in the first memory comprises:
   receiving a ring from a public exchange to an Analog Trunk Convergency (ATC) circuit in a PBX;
   detecting, at a ring detecting block, whether the ring is received, and reporting, at a local control block, to a system control circuit through a system bus regarding the reception of the ring;
   if receiving the ring is reported, connecting, at the system control circuit in the PBX, a highway as a data path of a corresponding port to a highway of a Caller ID (CID) service circuit through a switching block;
   detecting, at a CID detecting block, the CID through a highway convergency circuit based on a predetermined signal; and
   storing the detected CID in a predetermined area per port in a CID detection memory, through a memory interface block.

12. The method according to claim 8, wherein storing prearranged CIDs for transmission in the second memory comprises:
   if receiving the call is reported from the Analog Trunk Convergency (ATC) circuit, transmitting, at a system control block, a ring transmission message to a local control circuit in a Subscriber Line Convergency (SLC) circuit using a system bus through a system bus control block, and simultaneously, transmitting a system signal and/or a caller ID message; and
   if the local control circuit receives at least one of the ring transmission message, the system signal, and the caller ID message, transmitting, at the local control block, the signal and/or storing the system signal and the caller ID in a caller ID transmitting memory.

13. The method according to claim 8, further comprising: displaying the transmitted CIDs on the caller ID terminal.

14. A method for transmitting and receiving a Caller ID (CID) in a Private Branch Exchange (PBX), the method comprising:
   receiving a ring from a public exchange to an Analog Trunk Convergency (ATC) circuit in a PBX;
   detecting, at a ring detecting block, whether the ring is received, and reporting, at a local control block, the reception of the ring to a system control circuit through a system bus;
   if receiving the ring is reported, connecting, at the system control circuit in the PBX, a highway as a data path of a corresponding port to a highway of a Caller ID (CID) service circuit at the PBX through a switching block;
   detecting, at a CID detecting block, the CID through a highway convergency circuit based on a predetermined signal;
   storing the detected CID in a predetermined area per port in a CID detection memory of the CID service block, through a memory interface block
   if receiving the ring is reported from the ATC circuit, transmitting, at a system control block, a ring transmission message to a local control circuit in a Subscriber Line Convergency (SLC) circuit using a system bus through a system bus control block, and simultaneously, transmitting a system signal and/or a caller ID message;
   if the local control circuit receives at least one of the ring transmission message, the system signal, or the caller ID message, transmitting, at the local control block, the signal and/or storing the system signal and the caller ID in a caller ID transmitting memory in the CID service block;
   reading, at a system control block, the system signal and/or the CID stored in the CID transmitting memory, and transmitting the CID to the SLC circuit through a switching circuit and a system bus; and
   if the local control circuit in the SLC circuit provides the CID to a corresponding port, transmitting the CID through a subscriber line and displaying the CID on a caller ID phone at a subscriber side.

15. A PBX communication system comprising:
   a CID service circuit, the CID service circuit comprising:
      a first memory configured to receive and store a Caller ID (CID);
      a second memory configured to store preassigned CIDs out of the stored CIDs for transmission; and
      a switching circuit configured to transmit the CIDs stored in the second memory to a caller ID terminal.

16. The communication system of claim 15, further comprising:
   a Subscriber Line Convergency (SLC) circuit configured to receive the CIDs from the switching circuit and to route the CIDs to the caller ID terminal.

17. The communication system of claim 15, wherein the first memory is a caller detection memory of a CID service block.

18. The communication system of claim 15, wherein the second memory is a CID transmitting memory.

19. The communication system of claim 18, further comprising:

a system control circuit configured to store the preassigned for transmission in the CID transmitting memory, through a control circuit of a CID service circuit.

20. The communication system of claim 15, further comprising:

an Analog Trunk Convergency (ATC) circuit configured to receive a ring from a public exchange;

a ring detecting circuit configured to detect whether the ring is received, and to report the reception of the ring;

a system control circuit in the network exchange, configured to connect a data path of a corresponding port to a Caller ID (CID) service circuit through a switching block, if the ring is reported as received;

a CID detecting circuit configured to detect the CID through a highway convergency circuit based on a predetermined signal; and a memory interface circuit configured to store the detected CID in a predetermined area per port in a CID detection memory.

21. The communication system of claim 15, further comprising:

a system control circuit configured to transmit a ring transmission message to a local control circuit in a Subscriber Line Convergency (SLC) circuit, and to transmit a system signal and/or a caller ID message, if the call is reported from an Analog Trunk Convergency (ATC) circuit as received; and wherein the second memory id configured to store a system signal and/or caller ID, if the local control circuit receives at least one of the ring transmission message, the system signal and caller ID.

22. The communication system of claim 15, wherein the system control circuit is configured to transmit the ring transmission message and to transmit the system signal simultaneously.

23. The communication system of claim 15, wherein the network exchange is a Private Branch Exchange (PBX).

24. The communication system of claim 15, wherein the caller ID terminal is a phone configured to display the CID.

* * * * *